Feb. 22, 1966   P. SOPCHAK ETAL   3,236,590
ANHYDROUS DENSE SODA ASH
Filed Dec. 10, 1962
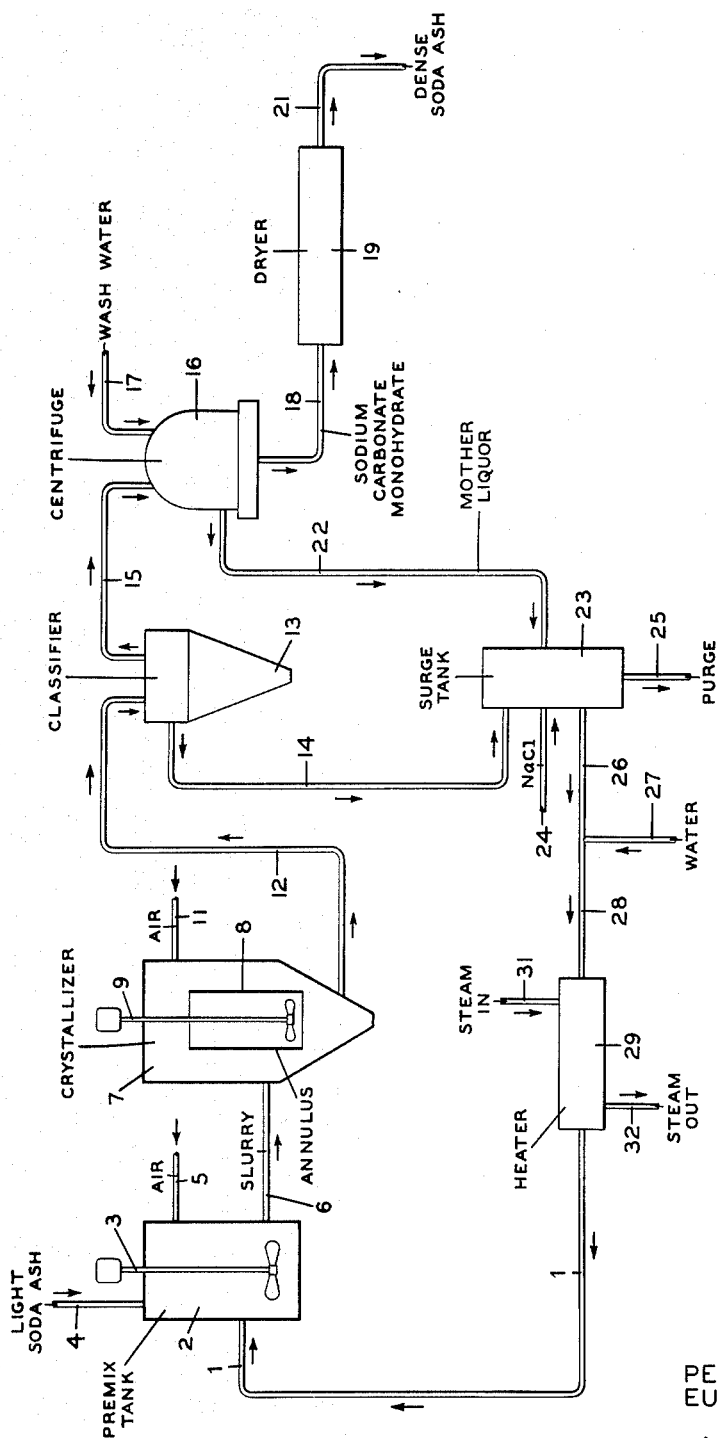
INVENTORS:
PETER SOPCHAK
EUGENE B. PORT
BY
Alvin Engelstein
ATTORNEY

3,236,590
ANHYDROUS DENSE SODA ASH
Peter Sopchak, Clay, and Eugene B. Port, Solvay, N.Y., assignors to Allied Chemical Corporation, New York, N.Y., a corporation of New York
Filed Dec. 10, 1962, Ser. No. 243,266
4 Claims. (Cl. 23—63)

This invention relates to dense soda ash and more particularly refers to a new and improved process for the conversion of light soda ash to high purity crystalline dense soda ash of superior properties eminently suitable for use in the manufacture of glass.

A major portion of dense ash is manufactured for use by the glass industry. The requirement of the glass industry for finer granulations of sand so that rapid batch melting may be achieved has brought steady pressure on soda ash manufacturers to produce finer granulations of dense ash which still retain desirable free-flowing and non-dusting properties. The more closely the soda matches the fine sands used, the less segregation occurs and the faster the melting rate. Segregation of the mixed materials before or during the melting is detrimental to this effort. High sodium chloride content in dense ash has been reported to adversely affect mold life and in general may be considered undesirable since it reduces the assay of $Na_2CO_3$ in the dense ash.

Light soda ash, a readily commercial available product, is a powdery material of low density about 500 grams per liter, contains appreciable amounts of impurities particularly sodium chloride and is unsuitable for use in the glass industry. The art has prepared dense ash by mixing excess hot water with hot light ash causing monohydrate crystals to form. This wet mass is then transferred to a drier where the free water and water of crystallization is removed leaving monohydrate skeletons as dense ash. Chemically, this resulting dense ash is no better than the light ash and since frequently various materials are added to the mixture as crystallization agents with the resulting dense ash being less pure than the starting light ash. Likewise the physical properties of the dense ash while usable in the glass industry leave much to be desired because the crystal structure is subject to breakage and attrition with the formation of dust and fine particles and frequently contains occluded impurities.

An object of the present invention is to provide a method for producing dense sodium carbonate crystals of high purity and of a size and shape which makes them eminently suitable for use in the manufacture of glass. Another object is to provide an efficient economical process for converting light soda ash to high quality dense soda ash. Other objects and advantages will be apparent from the following description and accompanying drawing.

Consideration of what constitutes high quality dense soda ash involves chemical composition, granular concentration, bulk density and particle geometry. Obviously the higher the assay ($Na_2CO_3$) the better the quality of the product. A distinct improvement in assay was obtained since average $Na_2CO_3$ content of analyzed pilot plant product produced in accordance with the present invention was 99.89% as compared to 99.72% for light ash and 99.62% for current conventional dense ash. Of particular importance in the quality of the product is the salt (NaCl) content. Conventional dense ash typically contains 0.31% NaCl; light soda ash used to make dense ash typically contains 0.25% NaCl. The product of the process of the present invention typically contains 0.04% or less sodium chloride. Sodium sulfate is also a normal impurity in soda ash and typically occurs in conventional dense soda ash and in light ash in an amount of 0.01%. The product of the process contains less than 0.004% sodium sulfate. Similarly the amount of magnesium carbonate impurities in the present product is about ½ of that which is typically present in conventional dense soda ash and light ash.

Granulation of the dense soda ash product should approximate sand used i.e. the range of size of particles of dense soda ash should reasonably approximate the range of size of the sand. As illustrative copied below is a tabulation wherein the granulation of dense soda ash produced in accordance with the present invention is compared with sand from two different sources.

Granulation
(Percent Retained Each Screen)

| Tyler Mesh Screen | Dense Soda Ash | Sand | |
|---|---|---|---|
| | | Manley Source | Penn Source |
| #20 | | 0 | 0 |
| 30 | | 0 | 1 |
| 40 | 13 | 3 | 14 |
| 60 | 42 | 55 | 60 |
| 80 | 22 | 30 | 16 |
| 100 | 8 | 6 | 4 |
| 150 | 9 | <1 | 4 |
| 200 | 4 | 5 | 1 |
| −200 | 2 | 1 | |

While not precise the dense soda ash is considered a good match for the sand.

Bulk density of about 60–65 pounds per cubic foot i.e. about 950 to 1075 grams per liter is considered excellent for use in glass manufacture. Dense ash produced in the pilot plant in accordance with the present invention normally had a bulk density ranging from 975 to 1050 grams per liter. Bulk density should not be considered by itself but also in relation to the shape and average size particle which have a significant bearing on final density. Agglomeration, occurring either during crystallization or drying, adversely affects density. Finer granulations tend to increase the density. Material with rounded corners tends to higher bulk densities. The quality of dense soda ash is also determined by its particle geometry i.e. appearance and shape. The dense soda ash crystallization product in accordance with the present invention is composed of dehydrated monohydrate crystal skeletons. Externally, preferred crystals resembled rectangular prisms with edges intact. Pilot plant material produced by the present process normally had a ratio of dimensions of height to width to length of 1:1:2–3, although it is possible if desired to increase the length. Segregation of pilot plant soda with the 1:1:2–3 dimensions when mixed with sand was shown to be at a minimum and essentially comparable to cubic ash.

Practical commercial operation for production of soda ash involves not only production of high quality soda ash but also manufacturing such product efficiently and economically which includes avoidance of difficulties normally encountered in such manufacture. More particularly a common difficulty occurring in the production of dense soda ash is "scaling" i.e. deposition of salt on the surfaces of the equipment namely reaction vessels, tanks and pipes which causes clogging and plugging of the equipment and requires frequent shutdowns with of course loss in productive capacity. In the process of the present invention scale formation was minimized to such an extent that it had no material effect on the operation.

In accordance with the present invention high quality dense soda ash eminently suitable for use by the glass industry may be prepared from light soda ash by a process involving admixing light soda ash with an aqueous solution containing dissolved therein 4–16%, preferably 10–14% by weight of sodium chloride, 10–27%, preferably 12–21% by weight of sodium carbonate, to produce a slurry of sodium carbonate solids dispersed in the aqueous liquid in which the solid particles constitute 10–20% preferably 13–17% by weight of the slurry, maintaining the aqueous solution during mixing with the light soda ash at a temperature below the transition temperature for conversion of sodium carbonate monohydrate to sodium carbonate but at a temperature not more than 5° below the transition temperature, preferably maintaining the temperature at 1–3° below the transition temperature, discharging the slurry from the mixing zone preferably after a retention time therein of less than five minutes and introducing said slurry into a crystallizer, maintaining the crystallizer at a temperature of 7 to 10° C. preferably 7 to 9° C. below the transition temperature to form crystals of sodium carbonate monohydrate, separating the crystalline sodium carbonate monohydrate from the mother liquor, washing the crystalline sodium carbonate monohydrate to remove adherent impurities, drying the separated crystalline sodium carbonate monohydrate to produce anhydrous dense soda ash, and returning the mother liquor together with added water to the mixing zone for admixture with additional light soda ash.

The accompanying drawing diagrammaticaly illustrates the present invention.

Referring to the drawing, aqueous solution containing dissolved sodium chloride and sodium carbonate are introduced through line 1 into premix tank 2 which may be any suitable enlarged vessel equipped with suitable stirring device 3 to vigorously agitate the contents. The aqueous solution should contain 4–16%, preferably 10–14% by weight NaCl. Sodium chloride in excess of about 16% in the solution tends to crystallize out and should be avoided and sodium chloride below about 4% gives infereior results and consequently it is important that the desired concentration of sodium chloride in the aqueous solution be maintained. Sodium chloride has the effect of permitting operation at lower temperatures inducing rapid and good crystal formation and inhibiting scaling. The aqueous solution which is recycled mother liquor contains dissolved sodium carbonate which normally is at or approaching the saturation point. Desirably the aqueous solution entering premix tank 2 through line 1 should contain little or no solid sodium carbonate monohydrate because it was found that the presence of monohydrate crystals entering the premix vessel had a tendency to cause preconversion and scaling. Light soda ash is introduced through line 4 into premix tank 2 and the mixture vigorously agitated by any suitable agitating means as for example a Cowles mixer. Temperatures within the premix tank are critical and have to be held to not more than about 5° C. below the $Na_2CO_3 \cdot H_2O \rightleftharpoons Na_2CO_3 + H_2O$ transition temperature for the suspending liquor. At temperatures below the transition temperature scaling proceeds at a very rapid rate. However, we have found that the presence of sodium chloride in the desired concentration in the aqueous liquid prevents scaling provided the temperature is not maintained more than 5° below the transition temperature. Thus it is important that not only the salt concentration be maintained in the aqueous liquid but also that the temperature be maintained within the critical limits of below the transition temperature but not more than 5° below the transistion temperature, preferably at about 3° below the transition temperature. The transition temperature of a substantially saturated sodium carbonate aqueous solution varies dependent upon the concentration of sodium chloride. With a 4% sodium chloride concentration the transition temperature is about 107° C. and this transition temperature drops proportionately so that with a concentration of about 16% sodium chloride the transition temperature is about 102½° C. The temperature in the premixer must be carefully controlled so that it should not be more than 5° C. below the transition temperature and thus should not be permitted to drop below about 102° C. when the aqueous solution contains 4% sodium chloride and about 97½° C. when the aqueous solution contains 16% sodium chloride. In practice we have found excellent results were obtained by maintaining the premixer temperature about 2 to 3° below the transition temperature.

Temperature control in premixer 2 can be obtained by adjusting the temperature of the said suspending liquor entering through line 1 as for example by preheating the feed to the desired temperature prior to its entrance into premix tank 2. However additional control of the temperature of the liquor in premix tank 2 may be obtained by blowing air entering through line 5 over the surface of the liquid which by its evaporative effect causes cooling of the body of liquid or alternatively reducing the pressure on the top of the tank to cause evaporation and cooling of the liquid. The temperature of the light soda ash entering through line 4 is not critical and may vary from as low as about 30° C. to as high as about 180° C. From a practical point of view this is important because it permits use of light soda ash from various sources at different temperatures. Slurrying of the light soda ash in the aqueous liquor premix tank 2 is accomplished in a very short time of the order of ½ minute to about 5 minutes which of course is desirable in that it means greater throughput. Although longer retention times may be employed in the premixer, retention times of greater than 5 minutes are not advisable because it was found the longer times tended to induce scaling and an inferior product.

The liquor with suspended solids is transferred from premix tank 2 through line 6 to crystallizer 7 which may be the usual crystallizer equipped with an annulus 8 and an agitator 9 which produces a flow pattern moving the slurry up the annulus. Concentration of suspended solids in the crystallizer may vary from about 5 to 25 settled volume percent of solids. Temperature of the crystallizer slurry circulating within the crystallizer 7 is critical and must be kept between about 7 to 10° C. below the transition temperature preferably about 7 to 9° C. below the transition temperature and will of course vary dependent upon the concentration of sodium chloride in the solution. For example with a concentration of 12% NaCl, this range would be 94½° C. to 97° C. Below this temperature range crystals become undesirably long and finer and above this range conversion rate decreased so that scaling was encountered on the crystallizer walls and in the equipment following the crystallizer. The NaCl in the desired concentration promotes formation of good crystal geometry and inhibits the scaling. Surprisingly even with the relatively large quantities of NaCl dissolved in the liquid, sodium chloride does not precipitate out and the sodium carbonate monohydrate crystals are dense hard crystals with flat surfaces which do not contain occluded sodium chloride. Temperature of the crystallizer may be controlled by a variable stream of air introduced through line 11 into the top of the crystallizer 7 and passed over the surface of the liquor. Other methods for controlling the temperature may be employed as for example for a vacuum control in an exit vapor line which would hold the boiling temperature of the surface liquor constant. Crystal formation is quite rapid and crystals of the desired size distribution are normally produced in a short retention time of about 7 to 10 minutes; also somewhat shorter and longer times, e.g. 5–30 minutes may be employed, for other size distributions.

Sodium carbonate monohydrate crystals in mother liquor are discharged from crystallizer 7 through line 12 into classifier 13 which may be of any conventional type, as for example the Dorrclone classifier manufactured by the Dorr-Oliver Co., Stamford, Conn. The classifier serves to make a preliminary separation of the monohydrate crystals prior to more complete separation from the motor liquor in the centrifuge. The classifier separates the bulk of the motor liquor discharging through line 14 from the sodium carbonate monohydrate crystals discharging through line 15 and if desired a third stream, not shown in the drawing, containing fine particles of less than 100 mesh solid sodium carbonate may be withdrawn from the classifier and returned directly to crystallizer 7.

The separation of sodium carbonate monohydrate crystals from mother liquor flowing through line 15 is accomplished in a conventional centrifuge 16 such as a Baker Perkins ter Meer Centrifugal. Provision is made to wash the crystals by means of washer water entering through line 17 preferably hot wash water at a temperature of 60–90° C. The quantity of wash water required is quite small usually about 0.1 to 0.2 pound of water per pound of cake and gives crystals containing less than 0.05% NaCl.

The washed centrifuged sodium carbonate monohydrate crystals containing less than 5% free water are discharged through line 18 into drier 19 which may be any steam tube drier of conventional design. Optimum conditions of operating the steam tube drier are such as to give a discharge temperature less than 180° C. but more than 150° C., an exit gas dry bulb temperature of >98° C., an exit gas wet bulb temperature of <80° C., a peripheral drier speed >75 ft./min., a retention time >22 min., a feed free moisture content of <3%, and a feed temperature of >60° C. The product dense anhydrous soda ash is discharged from the drier through line 21.

Mother liquor separated in the centrifuge is returned via line 22 to surge tank 23 into which is also introduced liquor from classifier 13 entering through line 14. Sodium chloride or preferably brine is introduced into the system through line 24. Normally sodium chloride is introduced in the desired amount only at the start of the operation. In the course of operation, particularly if the light soda ash contains a substantial amount of sodium chloride the concentration of sodium chloride in the motor liquor may build up to too high a value and the desired concentration may be maintained by purging a small amount of liquid from the bottom of surge tank 23 through line 25. Any solids or impurities settling in the bottom of surge tank 23 may also be discharged through line 25. The mother liquor which may contain some fine particles of solid sodium carbonate are discharged from surge tank 23 through line 26. Make up water is introduced through line 27 and combined with the mother liquor in line 26 to compensate for water lost in the system. The make up water also serves to dissolve solid fine particles of sodium carbonate. The combined stream of mother liquor and make up water may be filtered, not shown in the drawing, to remove any solids which might be contained in the liquor. The combined stream of water and mother liquor then pass through line 28 into a heater 29 which may be a simple heat exchanger wherein the liquor stream is heated by indirect contact with steam at 10–30 p.s.i.g. entering through line 31 and discharging through line 32. The preheated liquor then flows through line 1 into premix tank 2.

The following example illustrates the present invention.

Into a pilot plant similar to that illustrated in the drawing a feed of aqueous liquor (recycle liquor) containing 13.1% NaCl and 16.2% $Na_2CO_3$ was continuously fed at the rate of 8.3 gallons per minute into a premix tank and simultaneously commercial light soda ash was introduced into the top of the tank at the rate of 16.9 pounds per min. The premix tank had an effective volume of about 40 gallons and vigorous agitation was provided by a Cowles mixer. The average temperature in the premix tank was 102° C. which is about 2° C. below the transition temperature. Air at an average rate of about 0.6 pound per minute was blown across the surface of the liquid in the premix tank to control the temperature.

Slurry having the below composition was continuously discharged from the premix tank and continuously fed into a crystallizer.

Solid-lbs. per minute:
15.3 $Na_2CO_3$

Liquid-lbs. per minute:
11.2 NaCl
15.4 $Na_2CO_3$
60.1 $H_2O$

Circulation velocity within the crystallizer was about 12–14 feet per minute. Suspended solids concentration was about 10 to 15% as measured by settled volumes. The temperature of the crystallizer averaged 96.5° C. which is 7° C. below the transition temperature. There were no plug-ups in the crystallizer discharge or in the classifier following the crystallizer. Crystals of sodium carbonate monohydrate in mother liquor having the following composition were continuously discharged from the crystallizer at the rate of 8.8 gallons per minute and directed to a classifier.

Solid-lbs. per minute:
20.0 $Na_2CO_3 \cdot H_2O$

Liquid-lbs. per minute:
11.2 NaCl
13.6 $Na_2CO_3$
55.2 $H_2O$

From the classifier there was discharged a slurry of crystalline sodium carbonate monohydrate at the rate of 4.0 gallons per minute which was sent to a centrifuge. Mother liquor separated from the crystals discharged from the classifier at the rate of 4.8 gallons per minute and was directed to the surge tank. In the centrifuge further separation of the mother liquor from the crystallizer took place and the crystals were washed with hot wash water at 70° C. introduced at the rate of 2 pounds per minute. The crystals containing about 4% free water were then dried in a steam tube drier and produced at the rate of about 16.9 pounds per minute crystals of anhydrous soda ash containing about 0.04% NaCl which crystals were of rectangular shape and had an average dimension of 1:1:2-3 and a density of 1050 grams per liter. These crystals were found to be well adapted to mixing with sand without segregation. Mother liquor separated in the centrifuge was then directed to the surge tank wherein it was mixed with the mother liquor from the classifier. The mother liquor was continuously withdrawn from the surge tank and to the withdrawn liquor 4.1 pounds per minute water added and then the mixture preheated in an exchanger and directed to premix tank.

Although certain preferred embodiments of the invention have been disclosed for purpose of illustration, it will be evident that various changes and modifications may be made therein without departing from the scope and spirit of the invention.

We claim:
1. A process for the conversion of light soda ash to high quality dense soda ash suitable for use by the glass industry which comprises admixing light soda ash with an aqueous solution having dissolved therein 4–16% by weight of sodium chloride and 10–27% by weight of sodium carbonate to produce a slurry of sodium carbonate solids dispersed in the aqueous liquid, maintaining the aqueous solution during mixing with the light soda ash at a temperature below the transition temperature for conversion of sodium carbonate monohydrate to sodium carbonate but at a temperature not more than 5° below the transition temperature, passing the slurry of light soda ash in aqueous liquid into a crystallization zone and maintaining the temperature of the slurry in said zone at a temperature within the range of 7 to 10° C. below the tran- sition temperature to form crystals of sodium carbonate monohydrate, separating the crystalline sodium carbonate monohydrate from mother liquor, washing the crystalline sodium carbonate monohydrate to remove adherent impurities, drying the separated crystalline sodium carbonate monohydrate to produce anhydrous dense soda ash, and returning mother liquor together with added water for admixing with additional light soda ash.

2. A process for the conversion of light soda ash to high quality dense soda ash suitable for use by the glass industry which comprises admixing light soda ash with an aqueous solution having dissolved therein 10–14% by weight of sodium chloride and 12–21% by weight of sodium carbonate to produce a slurry of sodium carbonate solids dispersed in the aqueous liquid, maintaining the aqueous solution during mixing with the light soda ash at a temperature within the range of 1–3° C. below the transition temperature for conversion of sodium carbonate monohydrate to sodium carbonate, passing the slurry of light soda ash in aqueous liquid into a crystallization zone and maintaining the temperature of the slurry in said zone at a temperature within the range of 7 to 9° C. below the transition temperature to form crystals of sodium carbonate monohydrate, separating the crystalline sodium carbonate monohydrate from mother liquor, washing the crystalline sodium carbonate monohydrates to remove adherent impurities, drying the separated crystalline sodium soda ash, and returning mother liquor together with added water for admixture with additional light soda ash.

3. A process as claimed in claim 1 wherein the aqueous liquor for admixture with light soda ash is substantially free of solid particles of sodium carbonate.

4. A process for the conversion of light soda ash to high quality dense soda ash suitable for use by the glass industry which comprises admixing light soda ash with an aqueous solution having dissolved therein 10–14% by weight of sodium chloride and 12–21% by weight of sodium carbonate to produce a slurry of sodium carbonate solids dispersed in the aqueous liquid, maintaining the aqueous solution during mixing with the light soda ash at a temperature within the range of 1–3° C. below the transition temperature for conversion of sodium carbonate monohydrate to sodium carbonate, discharging the slurry from the mixing zone after a retention time therein of less than five minutes, passing said slurry of light soda ash in aqueous liquid into a crystallization zone and maintaining the temperature of the slurry in said zone at a temperature within the range of 7 to 9° C. below the transition temperature to form crystals of sodium carbonate monohydrate, separating the crystalline sodium carbonate monohydrate from mother liquor, washing the crystalline sodium carbonate monohydrate to remove adherent impurities, drying the separated crystalline sodium carbonate monohydrate to produce anhydrous dense soda ash, and returning the mother liquor together with sufficient added water to effect solution of solid particles of sodium carbonate in the mother liquor to the mixing zone for admixture with additional light soda ash.

References Cited by the Examiner
UNITED STATES PATENTS

| | | | |
|---|---|---|---|
| 2,133,455 | 10/1938 | Keene et al. | 23—63 |
| 2,267,136 | 12/1941 | Robertson | 23—63 |
| 2,887,360 | 5/1959 | Hoekje | 23—63 |
| 3,061,409 | 10/1962 | Robson et al. | 23—63 |

MAURICE A. BRINDISI, *Primary Examiner.*